Aug. 11, 1970   A. E. CARL   3,523,392
APPARATUS FOR MEASURING AND CUTTING LENGTHS OF CABLE
Filed April 29, 1968   2 Sheets-Sheet 1

ALLEN E. CARL
INVENTOR
BY
BUCKHORN, BLORE, KLARQUIST & SPARKMAN
ATTORNEYS

Aug. 11, 1970    A. E. CARL    3,523,392
APPARATUS FOR MEASURING AND CUTTING LENGTHS OF CABLE
Filed April 29, 1968    2 Sheets-Sheet 2
FIG. 3
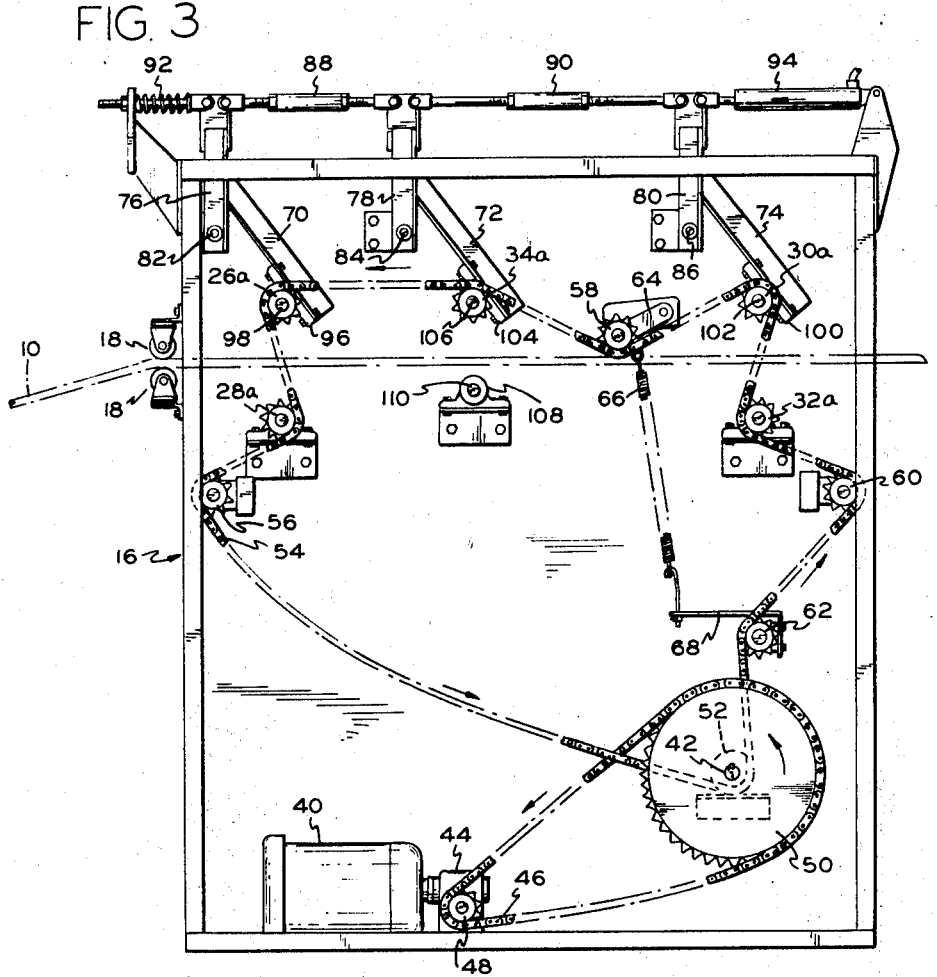
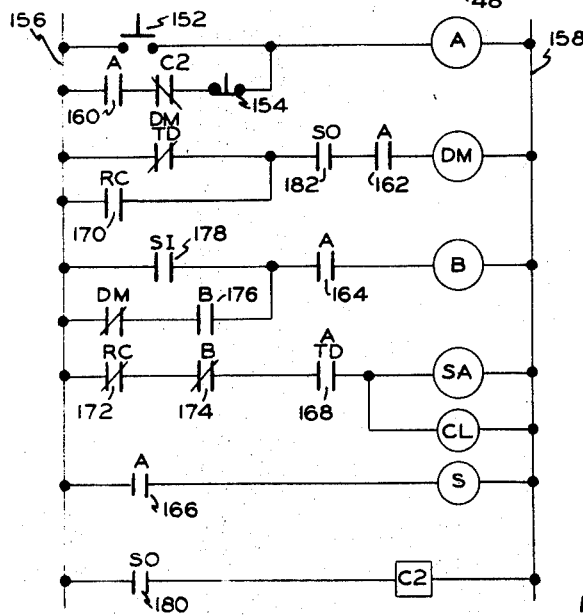
FIG. 4
ALLEN E. CARL
INVENTOR
BY
BUCKHORN, BLORE, KLARQUIST & SPARKMAN
ATTORNEYS

3,523,392
APPARATUS FOR MEASURING AND CUTTING LENGTHS OF CABLE

Allen E. Carl, 3150 Pacific Way,
Longview, Wash. 98632
Filed Apr. 29, 1968, Ser. No. 725,044
Int. Cl. B24b 49/00

U.S. Cl. 51—99             14 Claims

ABSTRACT OF THE DISCLOSURE

Apparatus for measuring and cutting lengths of cable includes pairs of opposed rollers for gripping said cable and transporting the same along a guide means. A metering roller frictionally engaging the cable in the guide means measures a predetermined length of cable, whereupon transport of the cable in the guide means is discontinued, and a clamping device securely clamps the cable within the guide means. An abrasive wheel is then pivotally moved through a slot in the guide means, and a matching slot in the clamping device, for severing the cable, after which the cable is unclamped, and transport thereof is resumed for measuring and severing another length of cable.

BACKGROUND OF THE INVENTION

Wire cable, wire rope, or the like is usually cut into useful lengths by hand. Thus, a spool or drum of cable or wire is placed upon a turntable from which lengths of cable are withdrawn and manually measured, e.g. between a saw or other cutting means adjacent the turntable and a measuring scale on the opposite side of the saw from the turntable. One length of cable may then be severed, and the operation is repeated. This type of operation is not only time-consuming and space-consuming, but can require two or three men depending on the size of cable, lengths of cable severed etc.

SUMMARY OF THE INVENTION

According to the present invention, apparatus for measuring and cutting lengths of wire rope or cable includes means for transporting the cable past a given point while the cable transported is metered until a predetermined length of cable is fed out. Then transport of the cable is discontinued, and the cable is securely clamped, e.g. against a guide means carrying the cable. The cable is then severed, for example employing a rotating abrasive wheel received through a slot in the guide means, after which transport of the cable is reinitiated for metering and severing further lengths thereof.

It is accordingly an object of the present invention to provide an improved apparatus for automatically measuring and cutting lengths of cable without the requirement of manually measuring and handling the lengths of cable.

It is a further object of the present invention to provide an improved apparatus for measuring and cutting lengths of cable, which apparatus may be preset to cut a predetermined number of lengths of cable of common predetermined length.

It is a further object of the present invention to provide an improved apparatus for measuring and cutting lengths of cable which apparatus is of rugged but simple construction and which may be economically manufactured.

The subject matter which I regard as my invention is particularly pointed out and distinctly claimed in the concluding portion of this specification. The invention however, both as to organization and method of operation, together with further advantages and objects thereof, may best be understood by reference to the following description taken in connection with the accompanying drawings wherein like characters refer to like elements.

DRAWINGS

FIG. 3 is a rear elevational view of the apparatus according to the present invention; and FIG. 4 is a simplified schematic diagram of circuitry which may be employed in operating the apparatus of the present invention.

DETAILED DESCRIPTION

Figure 1:
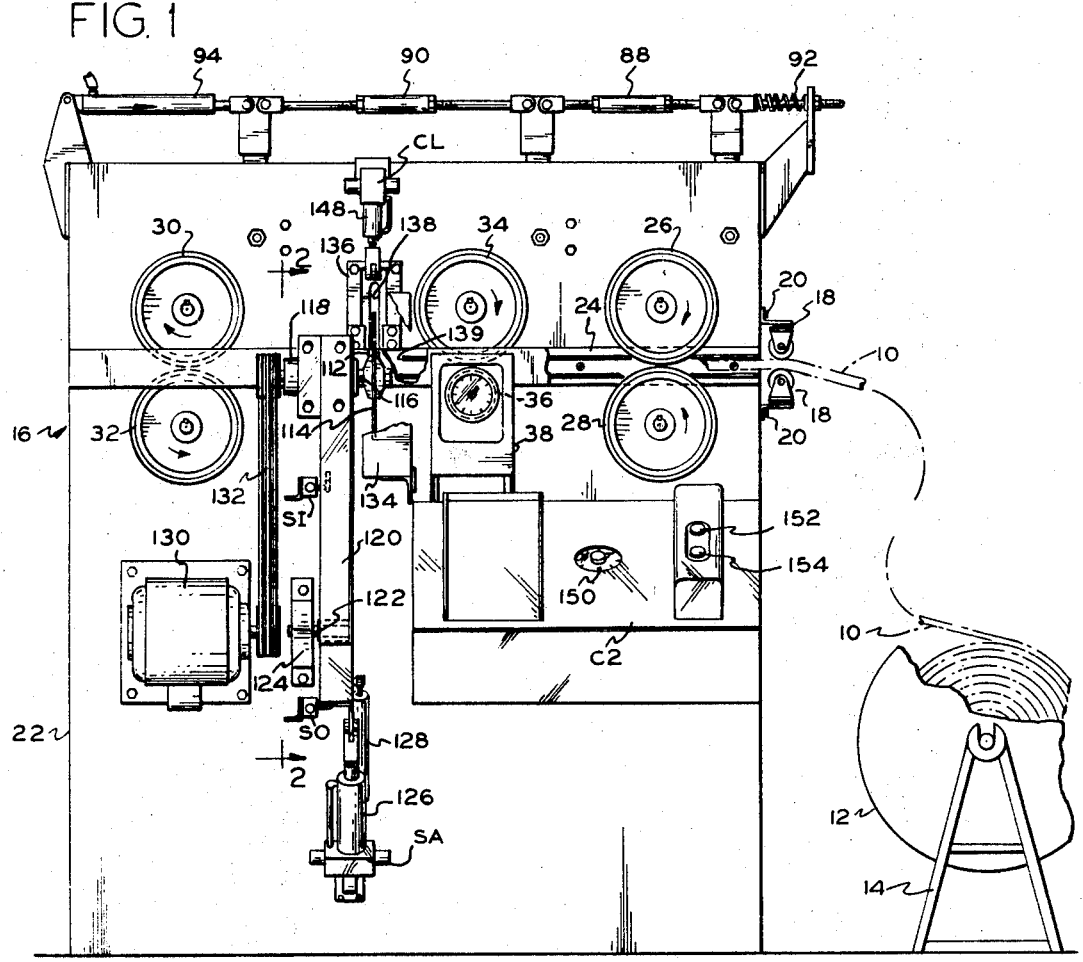
FIG. 1 is a front elevational view of apparatus according to the present invention.
Figure 2:
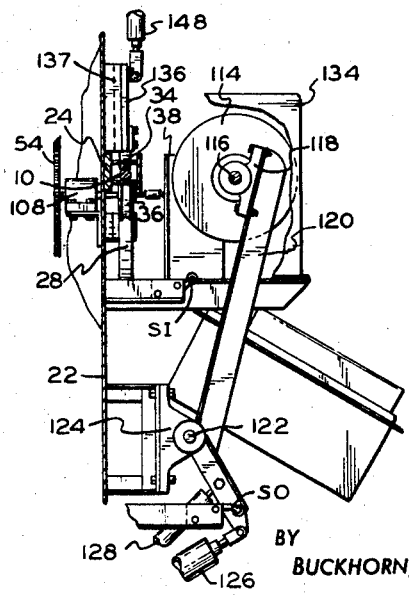
FIG. 2 is a side view of a portion of the FIG. 1 apparatus taken at 2—2 in FIG. 1.

Referring to the drawings, and particularly to FIGS. 1 through 3, the apparatus of the present invention is employed to cut or sever lengths from a supply of wire rope or steel cable 10 contained, for example, on a reel 12 mounted on stand 14. The cable is fed into the apparatus generally indicated at 16 through a pair of vertically opposed casters or cable sheaves 18. These casters are grooved to receive a range of cable sizes, and act to guide the cable into apparatus 16, the casters being adjustable vertically on the apparatus by means of mounting screws 20.

The apparatus includes a vertical frame 22 on the front of which a horizontal guide means 24 is mounted. This horizontal guide means is open inside and approximately square in cross section for receiving the extended end of cable 10 and for supporting a length of said cable. The guide means 24 is interrupted by a first pair of rubber-edged rollers 26–28, and a second pair of rubber-edged rollers 30–32 spaced along the guide means from the first pair of rollers and located on the opposite side of guide rollers 26–28 from casters 18. Between the first and second sets of rollers is positioned a third set of rubber-edged rollers 34–36 also interrupting the guide means, wherein the bottom roller is employed for metering purposes. For this reason bottom metering roller 36 engages the cable for rotation with movement of the cable and has an accurately predetermined circumference, e.g. in the specific apparatus disclosed, metering roller 36 had a circumference around its periphery of one foot. Roller 36 drives a revolution counter or similar device 38 mounted on the front side of frame 22 which operates contacts RC (see FIG. 4) when roller 36 has executed a predetermined number of revolutions. Since roller 36 has a predetermined circumference, the number of revolutions of roller 36 is a measure of the length of cable 10 passed between rollers 34–36 in frictional engagement therewith. Revolution counter 38 may be of a commercially available type, e.g. of the type obtainable from the Eagle Signal Division of the E. W. Bliss Company.

All the rollers except roller 36 are adapted to frictionally engage the cable 10 for gripping and transporting the cable and for this purpose all rollers except roller 36 are driven. A drive motor 40 rotates jack shaft 42 through gear reduction unit 44 and by means of a roller chain 46 disposed between a sprocket 48 on the gear reduction unit and a larger sproket 50 keyed to jack shaft 42. Motor 40 is provided with dynamic braking so that when the same is shut off, the drive provided thereby will cease almost immediately. A small sprocket 52, also mounted on jack shaft 42, drives chain 54 which engages sprockets 56, 28a, 26a, 34a, 58, 30a, 32a, 60, and 62 in that order. Sprockets 26a, 28a, 30a, 32a, and 34a are mounted on the same shaft with and drive similarly numbered rollers on the front of the apparatus, while idler sprockets 56, 60, and 62 insure proper engagement between chain 54 and the respective roller driving sprockets. Of course, the chain 54 turns the rollers 26, 28, 30, 32, and 34 in a direction for causing movement of cable 10 through the apparatus. Sprocket 58 is mounted on pivoted arm 64 having a spring 66 attached thereto, the opposite end of spring 66 being connected in tension to plate 68 mounted on the frame. The spring 66 urges sprocket 58 downwardly against chain 54 for taking up slack in chain 54.

Sprockets 26a, 34a, and 30a are mounted respectively on arms 70, 72, and 74 extending angularly downwardly from crank arms 76, 78, and 80. Arm 70 at its lower extremity carries bearing block 96 for shaft 98 on which both roller 26 and sprocket 26a are mounted, while arm 74 similarly carries bearing block 100 journaling shaft 102 to which roller 30 and sprocket 30a are keyed. Also, arm 72 carries bearing block 104 journaling shaft 106 which carries roller 34 and drive sprocket 34a. Bearing block 108 secured to the frame supports shaft 110 mounting metering roller 36. Crack arms 76, 78, and 80 are pivoted at 82, 84, and 86 respectively on the frame and extend through vertical slots in the upper portion frame where they are connected together by a linkage comprising adjustable rod ties 88 and 90 pivotally connected to the tops of the crank arms. A compression spring 92 urges the arms to the right in FIG. 3, while pneumatic cylinder 94 is pivotally connected to crank arm 80 for urging the arms to the left as the appartus is viewed in FIG. 3. When pneumatic cylinder 94 is not actuated, each of the arms 70, 72, and 74 is urged downwardly by spring 92. Thus, spring 92 in compression causes rollers 26, 30, and 34 to be urged downwardly into frictional contact with the upper surface of cable 10 whereby the cable will be frictionally engaged by rollers 26–28, 34–36, and 30–32, respectively. When the cable is to be initially inserted into the apparatus, the same is introduced between casters 18 and along guide means 24 with pneumatic cylinder 94 operative such that rollers 26, 30, and 34 are upraised. After the cable is introduced between at least one set of rollers, pneumatic cylinder 94 can be deactivated such that the cable is engaged between the rollers. It will be noted that the rollers are operated together since arms 76, 78, and 80 are joined by adjustable rod ties 88 and 90, and therefore the proper spacing for a given size cable will be maintained by the rollers even if the cable for the moment does not engage all rollers. For example, the leading end thereof need only be located between rollers 26 and 28 when the appartus is started and the other rollers will be properly spaced. Spring biased sprocket 58 takes up the slack for different vertical positions of the rollers.

Guide means 24 is discontinuous where rollers 26–28, 30–32, and 34–36 come together so that these rollers may engage the cable and so that driven rollers 26–28, 30–32, and 34 may transport the cable along the guide means. Also, guide means 24 is provided with a transverse slot 112, substantially perpendicular to the length of guide means 24 through which a cuting means for the cable may be received. In this embodiment, the cutitng means comprises an abrasive wheel 114 suitably having a carbide or diamond edge and mounted upon shaft 116 journaled in bearing block 118. Bearing block 118 is carried on a substantially vertical upward-extending arm 120 which is pivoted at its lower end upon a shaft 122 journaled by bearing block 124 mounted on the front of frame 22. The arm pivots inwardly and outwardly for moving abrasive wheel 114 into and out of slot 112 in guide means 24. Movement of wheel 114 is substantially perpendicular to the guide means and to the path taken by cable 10. The arm 120 and wheel 114 are normally in an outward position but may be moved inwardly by action of doubleacting pneumatic cylinder 126 controlled by solenoid valve SA. When solenoid valve SA is activated electrically, it causes cylinder 126 to move arm 120 and wheel 114 inwardly through slot 112 with a slight delay. When solenoid valve SA is electrically deactivated, it causes cylinder 126 to operate in the reverse direction bringing arm 120 and wheel 114 back to their outward position. Damping cylinder 128 is also connected to arm 120 so movement of arm 120 will not be too rapid. In its outward position, arm 120 operates out limit switch SO. In its inward position, arm 120 operates in limit switch SI.

Saw motor 130, mounted on frame 22, is mounted such that its output shaft is coaxial with shaft 122 and V-belt pulleys are mounted on the shaft of motor 130 for driving V-belts 132 which engage V-belt pulleys mounted upon shaft 116. Motor 130 operates substantially continuously during the operation of the present appartus, and it can be seen that since the shaft of motor 130 is substantially aligned with shaft 122, proper tension is maintained on V-belts 132 as arm 120 pivots inwardly and outwardly with respect to the frame. A wheel guard 134 is mounted on frame 22 to cover the path of wheel 114.

A bifurcated clamp 136 carried by vertical guide 137 is positioned vertically above guide means 24 so that vertical movement of the clamp 136 carries it through opening 139 in the top of the guide means into the guide means in a direction substantially perependicular to the guide means and the path of travel of cable 10. One portion of clamp 136 is adapted to engage cable 10 on one side of slot 112, and the remaining portion of clamp 136 is adapted to engage cable 10 on the remaining side of slot 112 in the lower horizontal wall of the guide means. Thus the clamp holds the cable against the lower wall of the guide means on either side of slot 112. Between the bifurcated portions of clamp 136 is defined a vertical slot 138 aligned with slot 112 and having sufficient length for receiving wheel 114 as wheel 114 moves inwardly through slot 112. Clamp 136 is operated by double acting pneumatic cylinder 148 controlled by electrically operated solenoid valve CL such that when valve CL is electrically energized, the clamp moves downwardly with a slight delay, this delay being less than the delay in operation of arm 120. Then, when solenoid valve CL is deenergized, pneumatic cylinder 148 operates in the reverse direction to raise clamp 136.

In operation of the apparatus according to the present invention, pneumatic cylinder 94 is first operated to raise rollers 26, 30, and 34, after which cable 10 is fed between rollers 26 and 28, with the forward or lead end thereof positioned substantially adjacent rollers 34–36. Air pressure is then removed from pneumatic cylinder 94 whereby the cable 10 is gripped between rollers 26 and 28 as spring 92 expands. Drive motor 40 is started, and the cable is drawn between rollers 26 and 28, being fed from rollers 26–28 into rollers 30–32. The cable also passes between rollers 34–36, therebetween, which frictionally engage the same. Revolution counter 38 is previously set to count a predetermined number of revolutions (or an integral number of revolutions and a fraction) of roller 36 before its contacts RC are operated. When frictional engagement between cable 10 and roller 36 causes it to execute the predetermined number of revolutions so that contacts RC are operated, power to motor 40 is removed, and dynamic braking of the same causes immediate discontinuance of the rotation of driven rollers 26–28, 30–32, and 34. At this time, clamp 136 comes down against the cable, and abrasive wheel 114 moves inward to sever the same. As soon as abrasive wheel 114 has moved all the way in, limit switch SI is operated which causes the wheel to move out, and the clamp to rise. When arm 120 is all the way out, it operates limit switch SO which reinitiates operation of motor 40 for once again transporting cable 10. The cycle repeats a predetermined number of times as determined by presetting of adjustment 150 on an operation counter C2, the latter suitably comprising a Bliss Eagle Signal device, sold under the name of "Microflek," or a similar operation counter. As the apparatus cycles, a desired number of cable lengths are severed and discharged into a waiting container or the like which may be placed proximate discharge rollers 30 and 32.

The operation of the present invention will be further considered with reference to the simplified schematic electrical diagram of FIG. 4, employed for illustrative purposes. This control circuit is given by way of example of one possible control system, it being understood that other control arrangements may suitably be substituted therefor, and that the invention is in no way limited by the circuit disclosed. The circuit includes a start button 152 and stop button 154, also shown in the FIG. 1 view. After the counters 38 (FIG. 2) and C2 are set, operation of the start button causes the apparatus to cycle through the predetermined number of operations until the desired number of cable lengths are severed and discharged. The contacts of start button 152 are disposed in series with relay coil A between control power source conductors 156 and 158. Depressing button 152 energizes relay coil A which then remains energized through normally closed contacts C2 (associated with the operation counter), the contacts of normally closed stop button 154, and normally open A contacts 160 which are now closed. Relay coil A also closes A contacts 162, 164, and 166, and with a slight delay closes A–TD contacts 168. At this time, control S for abrasive wheel motor 130 is energized through A contacts 166. Since arm 120 carrying abrasive wheel 114 is initially in an out position, limit switch SO will be closed, completing a series circuit through SO contacts 182, A contacts 162, and normally closed contacts DM–TD to motor control DM for operating drive motor 40.

The drive motor control starts drive motor 40 for rotating rollers 26–28, 30–32, and 34. If cable 10 has been placed between rollers 26 and 28, with the forward end thereof adjacent to rollers 34–36, start of motor 40 will transport the cable and rotate metering roller 36. Assuming the apparatus has previously just finished a cycle of severing operation, normally open RC or revolution counter 38 contacts 170 will close as metering starts and before the DM–TD contacts, which operate in response to operation of the drive motor control with a time delay, open. Therefore, the circuit for the drive motor control will continue to be completed through RC contacts 170, SO limit switch contacts 182, and A contacts 162. Normally closed RC or revolution counter 38 contacts 172 will also be open during the metering operation, and will open before A–TD contacts 168 close. When a predetermined length of cable is metered out as determined by the setting of counter 38, RC contacts 170 open, disconnecting drive motor control DM, stopping operation of drive motor 40. Dynamic braking of motor 40 substantially immediately discontinues rotation thereof, although a slight additional rotation takes place in the drive rollers as a result of slack in chain 54.

RC contacts 172 close, operating the SA and CL valves through normally closed B contacts 174 and closed A–TD contacts 168. The CL valve operates pneumatic cylinder 148 and causes clamp 136 to move downwardly against the cable, with a slight delay, allowing the cable to stop first. Valve SA operates pneumatic cylinder 126 with a slightly longer delay, causing arm 120 to move abrasive wheel 114 inwardly through slot 112 to sever the cable. Complete inward movement of arm 120 operates limit switch SI, energizing relay coil B through closed A contact 164. A holding circuit for the B relay coil is completed through B contacts 176 and normally closed contacts DM, the latter being operated from the drive motor control since the drive motor is off at this time. The B relay coil opens normally closed B contacts 174 deenergizing the SA and CL valves causing the arm 120 to move outwardly and the clamp 136 to move upwardly. As soon as the arm 120 returns to its outward position, limit switch SO is operated whereby drive motor control DM is again energized and the cycle of operation repeats.

Operation counter C2 counts the number of times SO limit switch contacts 180 operate, and thus when a predetermined number of pieces of cable 10 are severed, the C2 contacts open the holding circuit to relay coil A. It should be noted that when start button 152 is first operated, completing the circuits which relay coil A controls, valves SA and CL do not operate immediately because of the delay in operation of A–TD contacts 168 permitting RC contacts 172 to open. Therefore, valves SA and CL do not operate until such time as a first predetermined length of cable is metered out.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Apparatus for measuring and cutting lengths of a cable provided from a supply source, comprising:
   means for gripping said cable and transporting said cable past a given point,
   means for repetitively metering predetermined lengths of said cable transported past said given point,
   means responsive to said metering means for stopping transport of said cable when a predetermined length of cable has been transported, securely clamping said cable, and severing said cable,
   and means for thereupon reinitiating transport of said cable past said given point until a said predetermined length of cable is again transported past said given point.

2. The apparatus according to claim 1 wherein said means for gripping said cable and transporting said cable comprises opposed rollers for frictionally engaging said cable.

3. Apparatus for measuring and cutting lengths of a cable provided from a supply source, comprising:
   guide means for receiving one end of an extended length of said cable provided from said supply source and for supporting a length of said cable,
   clamp means movable in a direction substantially perpendicular to said guide means and engageable with said cable for securely clamping said cable against said guide means,
   cutting means also movable substantially perpendicularly with respect to said guide means across the path of said cable in said guide means for severing said cable,
   a metering roller frictionally contacting said cable, said metering roller being accurately rotatable in response to longitudinal movement of said cable along said guide means to measure predetermined lengths of said cable,
   means for transporting said cable along said guide means until rotation of said metering roller indicates passage of a said predetermined length of cable therealong, and responsive in timed relation to said metering roller for thereupon discontinuing transport of said cable along said guide means,
   means also operative in timed relation with respect to said metering roller when rotation of said metering roller indicates passage of a predetermined length of cable for thereupon actuating said clamp means for securely clamping said cable against said guide means and for actuating said cutting means for severing a said predetermined length of said cable,
   and means for thereupon reinitiating operation of said means for transporting said cable along said guide means for automatically commencing another measuring and severing cycle of operation.

4. The apparatus according to claim 3 wherein said means for transporting said cable comprises opposed rollers for frictionally engaging said cable.

5. The apparatus according to claim 3 further including a slot in said guide means across and substantially perpendicular to said guide means through which said cutting means is movable for severing said cable.

6. The apparatus according to claim 5 wherein said clamp means is bifurcated to provide clamping of said cable against said guide means on either side of said slot in said guide means, and to provide clearance for movement of said cutting means relative to said guide means between bifurcated portions of said clamping means.

7. The apparatus according to claim 5 wherein said cutting means comprises a rotatable abrasive wheel receivable through the slot in said guide means and pivotally mounted for movement in said slot.

8. The apparatus according to claim 5 wherein said means for transporting said cable comprises two pairs of opposed rollers with one pair being located on each side of said slot in said guide means, each pair including an upper roller and a lower roller for frictionally engaging said cable therebetween, and means pivotally mounting the upper rollers for movement together in tandem relative to the lower rollers for maintaining approximately the same spacing between upper and lower rollers corresponding to a given size of cable.

9. The apparatus according to claim 8 including a first pivoted arm upon which a first upper roller is mounted, a second pivoted arm on which a second upper roller is mounted, and linkage means for connecting said arms for common movement.

10. The apparatus according to claim 9 further including a pneumatic cylinder connected to at least one of said pivoted arms for operating said pivoted arms in unison.

11. The apparatus according to claim 8 further including an additional roller frictionally engaging said cable in opposed relation to said metering roller, said metering roller being located between said pairs of rollers.

12. Apparatus for measuring and cutting lengths of cable provided from a supply source, comprising:

pairs of driven rollers frictionally engaging said cable for drawing said cable therebetween, said cable being fed from a first pair of said rollers to a second pair of said rollers, clamp means movable in a direction substantially perpendicular to the path of said cable between said first and second pairs of rollers for clamping said cable, cutting means also movable substantially perpendicularly with respect to the path of said cable between said first and second pairs of rollers for severing said cable, a metering roller for contacting said cable, said metering roller being rotatable in response to movement of said cable between said first and second pairs of rollers to measure a predetermined length of said cable, and means responsive to predetermined rotation of said metering roller for actuating said clamp means and said cutting means for severing said predetermined length of cable.

13. The apparatus according to claim 12 further including guide means for said cable between said pairs of rollers.

14. The apparatus according to claim 13 wherein said guide means is provided with a transverse slot between said pairs of rollers within which said cutting means is movable.

References Cited

UNITED STATES PATENTS

| | | | |
|---|---|---|---|
| 3,029,775 | 4/1962 | Nicholson | 83—208 X |
| 3,242,566 | 3/1966 | White | 51—5 X |
| 3,251,253 | 5/1966 | Eubanks | 83—208 |

OTHELL M. SIMPSON, Primary Examiner

U.S. Cl. X.R.

83—208, 369; 226—155